Aug. 14, 1956 H. O. HURD 2,758,382
COUNTERSINK GAUGE
Filed April 17, 1953 2 Sheets-Sheet 1
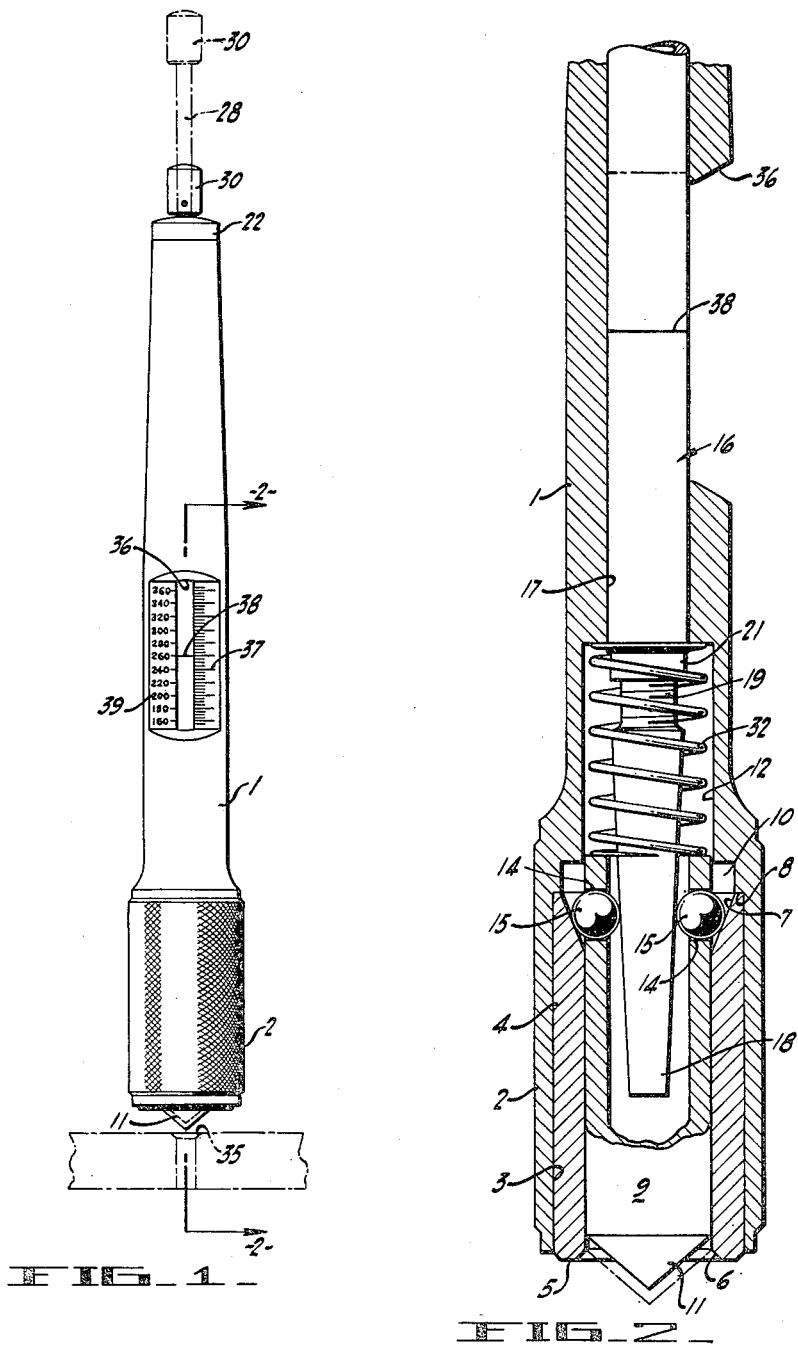
INVENTOR.
HURBERT O. HURD
BY
Mellin and Hanscom
ATTORNEYS

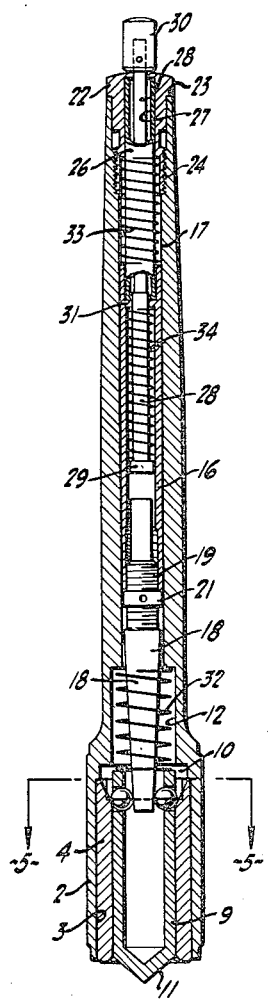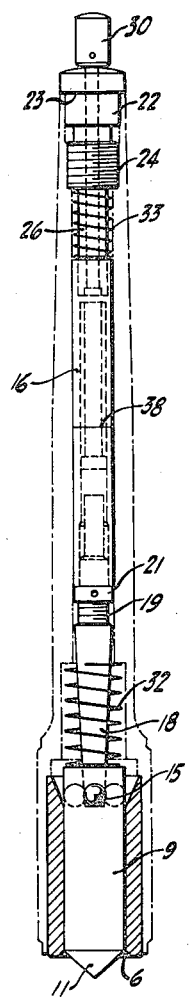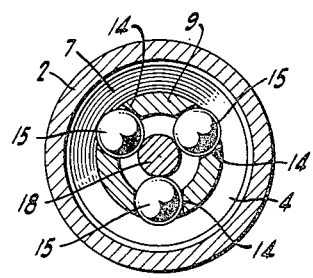

United States Patent Office 2,758,382
Patented Aug. 14, 1956

2,758,382

COUNTERSINK GAUGE

Hubert O. Hurd, Glendale, Calif., assignor to Trio Production Co., North Hollywood, Calif., a corporation of California Application April 17, 1953, Serial No. 349,411

13 Claims. (Cl. 33—172)

This invention relates to gauges, and particularly to a gauge for measuring recesses such as countersinks.

It is among the objects of my invention to provide a gauge for easily and accurately measuring countersinks and recessed areas of similar form.

Another object is to provide a gauge in which a plunger, movable to seat within a countersunk area, is shaped to conform accurately to the recess to be measured so that the depth and/or diameter may be accurately gauged.

Another object is to provide a gauge in which the movement of a measuring plunger is coordinated with a much greater movement of a gauge stem associated with the plunger, so that small measurements may be indicated in magnified degree upon a calibrated scale.

A further object is to provide a gauge in which relatively movable parts are held in gauging relationship, after the instrument is removed from a recess to be measured, to facilitate the observation of the calibrated scale.

It is also an object of the invention to provide an instrument which is extremely accurate, and by which work may be gauged within very close limits.

The invention has other objects and features of advantage, some of which with the foregoing will be explained in the following description of that form of the invention illustrated in the drawings. It is to be understood that the invention is not limited to the embodiment shown in the drawings, but may be embodied in a plurality of forms within the definition of the claims.

In the drawings:

Fig. 1 is a front elevation of a gauge embodying the invention.

Fig. 2 is a vertical sectional view, drawn upon a larger scale, the plane of the section being indicated by the line 2—2 of Fig. 1.

Fig. 3 is a vertical mid-sectional view, some of the inner parts being shown in elevation.

Fig. 4 is a side elevational view of the plunger and stem mechanism, removed from the casing.

Fig. 5 is a transverse sectional view, drawn upon a larger scale, the plane of the section being indicated by the line 5—5 of Fig. 3.

In terms of broad inclusion, the gauge of my invention comprises a casing within which is mounted a plunger having a portion movable axially outwardly to seat within a countersunk area or other recess to be gauged. The plunger is normally impelled toward an outwardly extending position by a spring, and is arranged to be displaced inwardly as the casing is pressed against the surface surrounding the recess. Preferably the plunger is frictionally held in its inwardly displaced or gauging position so as to facilitate observation of calibrations which are carried by the plunger and casing, and which are registrable for indicating the gauging position of the plunger relative to the casing. Preferably the movement of the plunger is regulated by a ball clutch, which in turn is controlled by a stem axially movable relative to the casing and plunger. The clutch operates in conjunction with a pair of opposing conical surfaces by which the stem is caused to move through a relatively long range of movement correlated with a short movement of the plunger, whereby minute differences in the position of the plunger are magnified so as to be readily readable upon the calibrated scale carried by the casing. Both the plunger and the stem are spring impelled in one direction, and are manually movable in the opposite direction to release the clutch and permit setting and releasing of the plunger.

In terms of greater detail, the gauge illustrated in the drawings comprises a body 1 provided with an enlarged knurled end 2 having a recess 3 into which is fitted a sleeve 4. The outer end of the sleeve 4 is machined to provide a flat seating surface, slightly spaced from the end of the knurled thread 2 of the tool, and slightly chamfered as at 6 to obviate engagement with a burr such as might be formed on the edge of a countersink. At its inner end, the sleeve 4 is provided with a conic surface 7 flaring concentrically with the sleeve. The inner end of the sleeve 4 seats against a shoulder 8 spaced from the bottom of the recess 3 to provide a chamber 10 between the sleeve 4 and the back of the recess 3.

A gauge plunger 9 is slidably mounted within the sleeve 4. The outer end of the plunger is closed, preferably by a cone shaped portion 11 shaped to conform to the angularity of recessed countersinks to be measured.

At its inner end, the plunger 9 extends into a bore 12 which extends into the body 1 coaxially with the recess 3. Radially disposed openings 14, preferably three in number, are formed in the wall of the plunger 9 to provide seats for clutch balls 15 of a diameter substantially greater than the thickness of the plunger walls. The openings 14 and balls 15 are spaced from the end of the plunger 9 to position the balls in engagement with the conic surface 7 at the inner end of the sleeve 4, as best illustrated in Fig. 2 of the drawings.

A hollow stem, designated in general by the numeral 16, is slidably mounted within a bore 17 which extends axially through the casing body 1 coaxially with the recess 3 and bore 12. A tapered extension 18 is secured to the stem 16 by means of a threaded shank 19. A lock nut 21 is threaded on to the shank 19, and is arranged to lock against the end of the sleeve 16 for securing the extension in axially adjusted position relative to the sleeve. The tapered extension 18 extends into the hollow plunger 9 past the clutch ball 15. The surface of the tapered extension 18 may be sanded or otherwise treated to insure accuracy and a fine finish for clutching engagement by the clutch balls 15.

The end of the casing 1 opposite the knurled head 2 is provided with a closure cap 22 shouldered as at 23 to seat against the end of the casing. The cap 22 is provided with a reduced threaded extension 24 by which the end cap is secured to the casing. A tubular sleeve 26 is inset in a bore 27 formed in the end cap 22, and extends axially along the casing 1 into engagement with the sleeve 16 into which it is slidably movable.

An actuating pin 28 is slidably movable axially through the end cap 22 and sleeve 26 into the sleeve 16. The pin 28 is provided with an enlarged head 29 upon its inner end. A knob 30 is pinned or otherwise secured upon the outwardly extending end of the actuating pin 28, which pin extends through an inwardly disposed flange 31 formed in the sleeve 16. The flange 31 provides a seat for the inner end of the sleeve 26, and also provides a bearing surface for the pin 28.

The gauge plunger 9 is impelled in an outward direction by a relatively heavy spring 32 which seats within the bore 12 between the inner end of the plunger and back of the bore 12. The stem 16 is impelled outwardly by means of a lighter spring 33 which is compressed between the sleeve 16 and the end cap 22. The actuating pin 28 is impelled inwardly by a light spring 34 which seats between the head 29 of the pin and the flange 31.

The device is cocked for a gauging operation by pulling the actuating pin 28 outwardly from the normal position, shown in full line in Figs. 1, 3 and 4, to its outward limit of movement as indicated in dotted lines in Fig. 1. As the pin is so moved, the spring 34 is compressed between the head 29 and the flange 31 and the stem 16 is moved axially to the retracted position shown in Fig. 3 of the drawings. When released, the pin 28 is impelled inwardly to its extreme position by the spring 34. The sleeve 16, however, will be held in a displaced position by the clutching action of the clutch balls 15.

As the sleeve 16 is moved to its cocked position, the tapered extension 18 moves freely past the balls 15 which are displaced into the space 10 in back of the conic surface 7. As the small end of the tapered extension 18 is moved between the balls 15, a rolling engagement with the balls is maintained, and pressure of the spring 32 causes the plunger 9 to be impelled outwardly as far as the engagement of the balls 15 between the extension 18 and conic surface 7 will permit. This allows the plunger 9 to move to the outer limit of its movement, as indicated in full lines in Figs. 3 and 4 of the drawings and in dotted lines in Fig. 2.

With the gauge thus cocked the conical point 11 of the plunger 9 is introduced into a countersink 35 to be measured, such as indicated in broken lines in Fig. 1. The casing 1 is then pressed toward the work so that the face 5 of the sleeve 4 seats against the planar surface surrounding the countersink. This causes the plunger 9 to be displaced inwardly from its extreme outer position, indicated in dotted lines in Fig. 2, to the gauging position indicated in full lines in that figure. During this movement, the clutch balls 15 are displaced laterally outwardly against the conic surface 7, the amount of such lateral displacement being proportional to the amount of axial movement of plunger 9. This outward displacement of the clutch balls 15 permits the tapered extension 18 to move into the hollow plunger 9 an amount corresponding to the lateral displacement of the balls 15, as indicated in full lines in Fig. 2 of the drawings. The pressures exerted by the springs 32 and 33 combine to cause the balls 15 to be wedged between the inclined surface 7 and the tapered extension 18, thereby holding the plunger firmly in the position to which it has been displaced by manual pressure as the casing 1 is pressed against the surface over the countersink which is being gauged.

It will be noted that a relatively slight displacement of the clutch balls 15 along the steeply inclined conic surface 7 permits a relatively long movement of the tapered extension 18. This long movement is utilized for scaling the movement for gauging purposes, a portion of the casing 1 being cut away to provide a window 36 through which a portion of the stem 16 may be observed.

Calibrations are marked on the sides of the window area, as at 37, and a marker 38 is provided on the stem to indicate the position of the stem with reference to the calibrations. Indicia 39 are applied along the edge of the window opening opposite the calibrations 37 for evaluating the calibrations in terms of the measurement to be gauged. For example, the gauge illustrated is calibrated in thousandths through a range from 160 to 360, as standardized for measuring countersinks cut at an angle of 100°. The instrument is adjusted at the factory to standardized countersinks by adjusting the tapered extension 18 axially to a proper position relative to the stem 16, and locking it in adjusted position by the lock nut 21. As illustrated in Fig. 1, the marker 38 is positioned opposite the 260 mark. This indicates that the conic point of the plunger 9 has been displaced inwardly from its initial set position an amount corresponding to a countersink having a diameter of .260 at the surface of the area into which it is cut. The displacement for countersinks of greater or lesser dimension will be correspondingly smaller or greater, and the stem will drop proportionately to a position such that the marker will correctly indicate the size of the countersink.

Since countersinks are cut to various depths and at various angles, the inclination of the conic point 11 is preferably designed to gauge a particular type of countersink, and the scale is designed to be effective through a desired range of sizes. A different gauge or a different plunger 9, may be provided for countersinks cut at different angles, as for example 45°, 60°, 100° or 120° as in common practice. Conversion tables may of course be worked out for translating the scale calibrations, as standardized for one angle of cut and one range of size, to identify a corresponding range sizes of countersinks cut at different angles.

The stem 16 will be held in its gauging position by the clutch action of the ball 15 until it is reset or cocked for another operation by again withdrawing the actuating pin 28. The plunger 9 may be moved to its innermost position by manually pressing the instrument against a flat surface, thereby displacing the point of the conic surface 11 to the plane of the edge 8. That action permits the stem 16 to move outwardly to its extreme position, with the marker 38 at or below the lowest calibration. The light spring 34 causes the actuating pin 28 to be moved to and held in its inward position at that time. When the gauge is reset or cocked, the pin 28 moves the sleeve 16 to a point such that the marker will be at or above the highest calibration where it remains until the plunger is displaced for gauging another countersink.

I claim:

1. A gauge comprising a casing, a spring actuated plunger slidably mounted for axial movement between fixed limits within the casing and provided with a portion movable outwardly from one end of the casing into seating engagement with a recess to be gauged, a stem mounted for axial movement within the casing, a tapered extension upon the stem extending axially into the plunger, and clutch means carried by the plunger and releasably engaging the casing and the tapered extension for regulating relative movement of the stem and plunger.

2. A gauge comprising a casing, a spring actuated plunger slidably mounted for axial movement between fixed limits within the casing and provided with a portion movable outwardly from one end of the casing into seating engagement with a recess to be gauged, a stem mounted for axial movement within the casing, a tapered extension upon the stem extending axially into the plunger, clutch means carried by the plunger and releasably engaging the casing and the tapered extension for regulating relative movement of the stem and plunger, and calibrations upon the stem and casing registrable for indicating gauging positions of the plunger.

3. A gauge comprising a casing, a spring actuated plunger slidably mounted within the casing and provided with a portion movable outwardly from the casing into seating engagement with a recess to be gauged, a conic surface within the casing surrounding the inner end of the plunger, a stem slidably mounted for axial movement within the casing, a tapered extension upon the stem extending into the plunger, and clutch means carried by the plunger and engaging the conic surface and tapered extension for releasably holding the plunger and stem in gauging relationship to each other and to the casing.

4. A gauge comprising a casing, a spring actuated plunger slidably mounted within the casing and provided with a portion movable outwardly from the casing into seating engagement with a recess to be gauged, a conic surface within the casing surrounding the inner end of the plunger, a stem slidably mounted for axial movement within the casing, a tapered extension upon the stem extending into the plunger, clutch means carried by the plunger and engaging the conic surface and tapered extension for releasably holding the plunger and stem in gauging relationship to each other and to the casing, and an actuating pin connected to the stem and extending outwardly from the casing.

5. A gauge comprising a casing, a spring actuated plunger slidably mounted within the casing and provided with a portion movable outwardly from the casing into seating engagement with a recess to be gauged, a conic surface within the casing surrounding the inner end of the plunger, a stem slidably mounted for axial movement within the casing, a tapered extension upon the stem extending into the plunger, clutch means carried by the plunger and engaging the conic surface and tapered extension for releasably holding the plunger and stem in gauging relationship to each other and to the casing, an actuating pin connected to the stem and extending outwardly from the casing, a window in the casing uncovering a portion of the stem along one side for a distance approximating its range of axial movement, and calibrations upon the stem and casing adjacent the window registrable for indicating gauging positions of the plunger.

6. A gauge comprising a casing, a spring actuated plunger slidably mounted within the casing and provided with a portion movable outwardly from the casing into seating engagement with a recess to be gauged, a conic surface within the casing surrounding the inner end of the plunger, a stem slidably mounted for axial movement within the casing, a tapered extension upon the stem extending into the plunger, clutch means carried by the plunger and engaging the conic surface and tapered extension for releasably holding the plunger and stem in gauging relationship to each other and to the casing, and means for adjusting the tapered extension axially relative to the stem and casing.

7. A gauge comprising a casing, a spring actuated plunger slidably mounted within the casing and provided with a portion movable outwardly from the casing into seating engagement with a recess to be gauged, a conic surface within the casing surrounding the inner end of the plunger, a stem slidably mounted for axial movement within the casing, a tapered extension upon the stem extending into the plunger, clutch means carried by the plunger and engaging the conic surface and tapered extension for releasably holding the plunger and stem in gauging relationship to each other and to the casing, means for adjusting the tapered extension axially relative to the stem and casing, a window in the casing uncovering a portion of the stem along one side for a distance approximating its range of axial movement, and calibrations upon the stem and casing adjacent the window registrable for indicating gauging positions of the plunger.

8. A gauge comprising a casing, a spring actuated plunger slidably mounted within the casing and having a portion movable outwardly therefrom into seating engagement with a countersunk area to be gauged, a spring actuated stem slidable within the casing and having a tapered end extending into the plunger, a conic surface surrounding the inner end of the plunger, clutch balls carried by the plunger and engaged between the conic surface and the tapered end of the stem, and means extending outwardly from the casing at the end opposite the plunger for moving the stem relative to the plunger.

9. A gauge comprising a windowed casing, a spring actuated plunger slidably mounted within the casing and having a portion movable outwardly therefrom into seating engagement with a countersunk area to be gauged, a spring actuated stem slidable within the casing and having a tapered end extending into the plunger, a conic surface surrounding the inner end of the plunger, clutch balls carried by the plunger and engaged between the conic surface and the tapered end of the stem, means extending outwardly from the casing at the end opposite the plunger for moving the stem relative to the plunger, and calibrations upon the stem and the casing adjacent the window for indicating gauging positions of the plunger and stem relative to the casing.

10. A gauge comprising a casing, a plunger slidably movable within one end of the casing and having a portion movable through an open end of the casing to seat upon an area offset from a planar surface on which the casing seats, a stem slidable within the casing and having an end extending into the plunger, opposing inclined conic surfaces upon the casing and the stem adjacent the inner end of the plunger, clutch balls carried by the plunger for clutching engagement between the conic surfaces, spring means for impelling the plunger and stem axially within the casing toward the open end thereof, and an actuating pin for manually moving the stem axially in the opposite direction.

11. A gauge comprising a casing, a plunger slidably movable within one end of the casing and having a portion movable through an open end of the casing to seat upon an area offset from a planar surface on which the casing seats, a stem slidable within the casing and having an end extending into the plunger, opposing inclined conic surfaces upon the casing and the stem adjacent the inner end of the plunger, clutch balls carried by the plunger for clutching engagement between the conic surfaces, a strong spring impelling the plunger to outwardly extending position, a lighter spring impelling the stem into the plunger, and means extending outwardly from the casing for moving the stem in a clutch releasing direction.

12. A gauge comprising a casing, a plunger slidably movable within one end of the casing and having a portion movable through an open end of the casing to seat upon an area offset from a planar surface on which the casing seats, a stem slidable within the casing and having an end extending into the plunger, opposing inclined conic surfaces upon the casing and the stem adjacent the inner end of the plunger, clutch balls carried by the plunger for clutching engagement between the conic surfaces, a strong spring impelling the plunger to outwardly extending position, a lighter spring impelling the stem into the plunger, means extending outwardly from the casing for moving the stem in a clutch releasing direction, and calibrations upon the casing and stem registrable for indicating gauging positions of the stem and plunger relative to the casing.

13. A gauge comprising a casing, an axially slidable plunger mounted within the casing and having an end outwardly movable through an open end of the casing, a stem axially slidably within the casing and having an end extending into the plunger, opposing conic surfaces upon the casing and stem facing the outer and inner surfaces of the plunger respectively, clutch means carried by the casing for effecting clutching engagement with the conic surfaces for releasably holding the plunger against axial movement, and spring means normally impelling the plunger and stem into clutching relationship, said plunger and stem being independently movable manually in a clutch releasing direction.

References Cited in the file of this patent
UNITED STATES PATENTS

| | | |
|---|---|---|
| 883,422 | Reiness | Mar. 31, 1908 |
| 1,459,896 | John | June 26, 1923 |
| 1,864,466 | Peterson | June 21, 1932 |
| 2,548,010 | Frisz | Apr. 10, 1951 |
| 2,592,758 | Stainton | Apr. 15, 1952 |
| 2,718,706 | Kustusch | Sept. 27, 1955 |

FOREIGN PATENTS

| | | |
|---|---|---|
| 310,370 | Germany | Jan. 16, 1919 |
| 591,332 | Germany | Jan. 19, 1934 |
| 432,869 | Great Britain | May 8, 1934 |
| 815,016 | France | Mar. 30, 1937 |
| 255,457 | Switzerland | Jan. 17, 1949 |